Nov. 16, 1948.  F. H. GERLACH ET AL  2,454,155

ELECTRIC MOTOR

Filed March 15, 1945

WITNESSES:

INVENTORS
Francis H. Gerlach and
John D. Miner, Jr.
BY
ATTORNEY

Patented Nov. 16, 1948

2,454,155

UNITED STATES PATENT OFFICE 2,454,155

ELECTRIC MOTOR

Francis H. Gerlach, Wapakoneta, and John D. Miner, Jr., Lima, Ohio, assignors to Westinghouse Electric Corporation, East Pittsburgh, Pa., a corporation of Pennsylvania Application March 15, 1945, Serial No. 582,854

3 Claims. (Cl. 172—36)

The present invention relates to small electric motors, and more particularly to a motor which is especially designed for mounting on a supporting plate with the axis of the motor at a minimum distance from the plate.

The principal object of the present invention is to provide an electric motor which can be mounted on a supporting plate with the axis of the motor shaft positioned at a distance from the plate which is only slightly greater than the radius of the armature of the motor. There are numerous applications of small electric motors in which it is necessary, or at least desirable, to mount the motor on a supporting member or plate in such a manner that the motor occupies as little space as possible, and in order to do this the motor shaft must be positioned as close to the supporting plate as possible. Various expedients have been used to obtain this result, but these expedients have always involved either an unsymmetrical motor construction or the use of a single concentrated field coil, or both. Motors of this type therefore have suffered from poor commutation, excessive magnetic leakage, excessive temperature rise due to the single concentrated coil, or a combination of these difficulties.

It is, accordingly, a further object of the invention to provide an electric motor which can be mounted with its shaft at a minimum distance from a supporting plate, in which good commutation is obtained and the magnetic leakage flux is small, and in which the temperature rise can be kept to a reasonable value. The new motor is also capable of being rapidly and easily assembled and disassembled.

Other objects and advantages of the invention will be apparent from the following detailed description, taken in connection with the accompanying drawing, in which.

Figure 1:
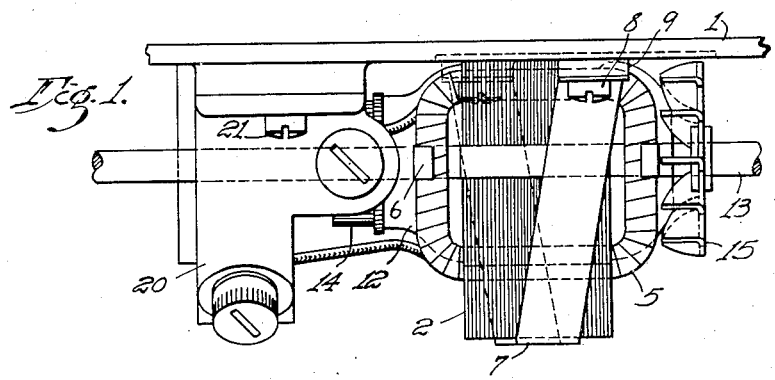
Figure 1 is a side elevation of the new motor assembled on its supporting plate.
Figure 2:
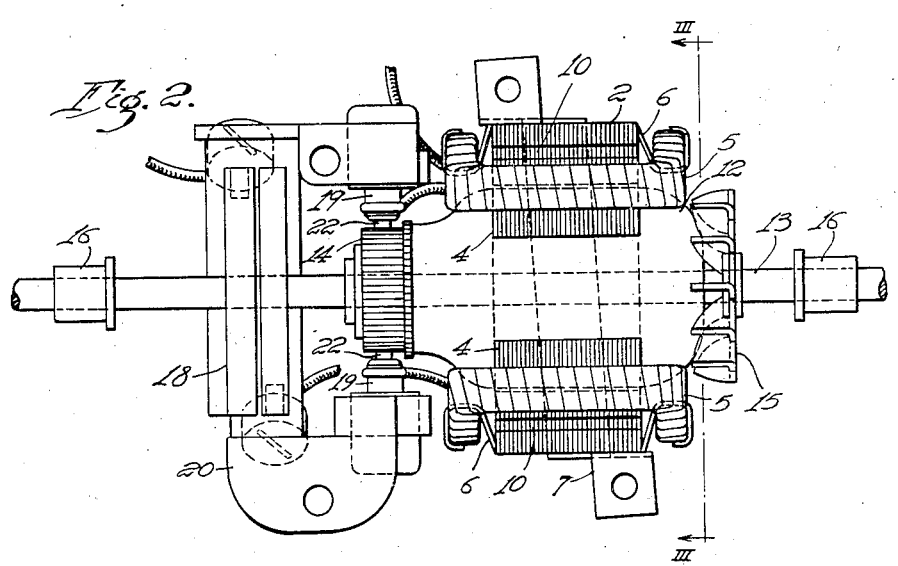
Fig. 2 is a plan view of the motor without the supporting plate.

As previously indicated, the motor of the present invention is especially intended for applications where the motor is of small size and must be mounted so as to occupy a minimum space. The particular motor shown in the drawing for the purpose of illustration is a universal sewing machine motor intended to be mounted on a supporting plate 1 which may be a part of the sewing machine structure. It is to be understood, of course, that the construction of the present invention is of general application and is not limited to this particular use. The motor is shown mounted on the bottom of the plate 1, but it could equally well be placed on top of the plate.

The motor itself includes a laminated core structure 2 which is built up of a plurality of laminations secured together in a stack by means of rivets 3, or in any other suitable manner. As clearly shown in Fig. 3, the laminations of which the core 2 is made up are generally U-shaped, having a central opening and one open side which is adapted to abut against the supporting plate 1. Polar projections 4 are formed on each of the two sides of the core 2 adjacent to the open side, and a field coil 5 is placed on each of the polar projections 4. The field coils 5 may be held in place by means of metal clips 6 which extend across the outside of the core structure 2, preferably in shallow grooves so as to be flush with the surface of the core.

The core 2 is secured to the supporting plate 1 by means of a metal strap or band 7 which extends around the core 2, and which may be secured to the plate 1 in any suitable manner, as by screws 8 extending into pads 9 on the plate 1. The strap 7 is preferably skewed, as clearly shown in the drawing, to firmly secure the core in position. If desired, the upper surface of the core 2, which abuts against the plate 1, may have grooves 10 formed in it for engagement with corresponding ribs 11 on the plate 1 in order to prevent relative displacement between the plate and the core. If desired, similar ribs might be provided on the plate 1 at the ends of the core to prevent any possibility of endwise movement.

The rotor member or armature 12 may be of any suitable construction and is mounted on a shaft 13. A commutator 14 is also mounted on the shaft and connected to the armature windings, and a fan 15 may be secured to the shaft at the opposite end of the armature to force a stream of cooling air through the motor. The shaft 13 is supported for rotation in bearings 16 which may be supported on the plate 1, or in any other suitable manner.

Since the core structure 2 is open at the top where it bears against the supporting plate 1, which may be of nonmagnetic material, the flux density in the polar projections 4 will not be uniform, but since the motor is symmetrical about the vertical center line, this non-uniformity in flux density has no adverse effect on the commutation. It is preferred, however, to make the distribution of flux as uniform as possible from one side to the other of the polar projections, and this is readily accomplished by making the reluctance of the flux path through the polar projections and the armature less at the side of the armature adjacent to the plate 1 than at the other side.

Figures 3, 4:
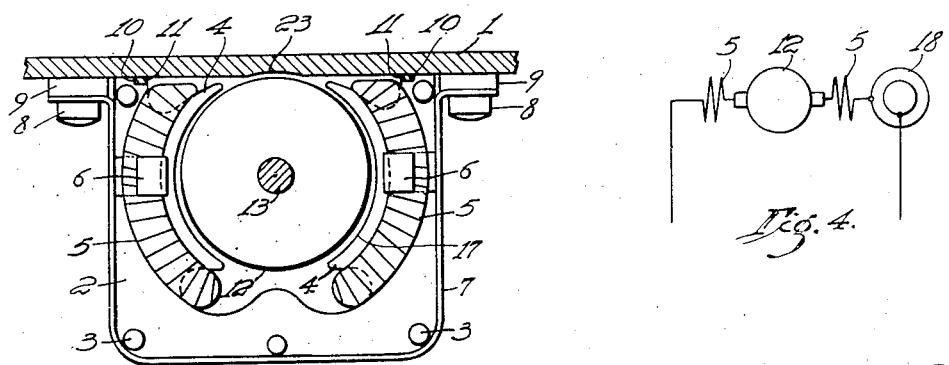
Fig. 3 is an end view of the motor, partly in section, on the line III—III of Fig. 2.
Fig. 4 is a wiring diagram showing the electrical connections of the motor.

As clearly shown in Fig. 3, this variation in reluctance is accomplished by tapering the air gap 17 between the armature 12 and the polar projections 4, so that the width of the air gap is least at the side of the motor adjacent the plate 1 and increases to its greatest width at the opposite side of the armature. This tapering of the air gap is obtained by a slight eccentricity of the axis of the shaft 13 with respect to the polar projections 4, or by the shape of the polar projections. With this difference in reluctance of the flux path, a larger part of the flux is forced toward the upper side of the motor, thus tending to compensate for the incomplete magnetic circuit on that side and making the distribution of the flux more uniform. It will be obvious that this variation in the reluctance of the magnetic path through the polar projections and armature could also be accomplished in other ways such as by punching a hole in the lower tip of each pole to cause that portion of the pole to saturate and thus force the flux toward the upper side of the motor.

The particular motor shown in the drawing is a universal or series motor having a governor to control the speed, the electrical connections of the motor being shown in Fig. 4, although the invention is also applicable to other types of motors. The governor 18 may be of any suitable construction and has not been shown in detail, since it forms no part of the present invention. The rotating parts of the governor are mounted on the shaft 13 adjacent the commutator 14, and the stationary parts of the governor, together with the brushholders 19, are mounted on a bracket member 20 which is secured to the mounting plate 1 by means of screws 21 in position for the brushes 22, which are supported in the brushholders 19, to engage the commutator 14.

It will now be apparent that a small electric motor has been provided which can be mounted on a supporting plate with the shaft at a minimum distance from the plate which may be only slightly greater than the radius of the armature itself, and if desired, the distance might even be made equal to the radius of the armature, or slightly less, by providing a recess 23 in the plate 1 to give proper clearance for the rotating armature. Since the new motor is symmetrical about the vertical center line, the nonuniform flux density resulting from the open side of the core has no adverse effect on the commutation, although this nonuniformity can be minimized by the use of a tapered air gap as described above. Thus, good commutation is readily obtained. Two separate field coils are used, one on each of the polar projections of the core, and in this way the heat loss in the motor is distributed over a relatively large area so that the temperature rise is not excessive, and the size of the motor for a given rating can be kept small. The use of two coils in this manner also reduces the magnetic flux leakage so that the leakage flux is relatively small. The manner in which the motor is mounted on the supporting plate is very simple and effective, since the mating grooves 10 and ribs 11 prevent relative movement between the motor and the mounting plate and the metal band 7 firmly holds the motor in place. The core can readily be removed, however, merely by removing one of the screws 8 and springing down the metal band 7. Thus, a very desirable construction is provided for motors which must be mounted so as to occupy the smallest possible space, and the disadvantages which have resulted from previous attempts at such a motor have been substantially eliminated.

It is to be understood that although a specific embodiment of the invention has been shown and described for the purpose of illustration, the invention is not limited to the particular details of construction shown, but in its broadest aspects it includes all equivalent modifications and embodiments which come within the scope of the appended claims.

We claim as our invention:

1. An electric motor adapted to be mounted on a supporting plate positioned at a minimum distance from the axis of the motor, said motor having a generally U-shaped laminated core, the open side of the U-shaped core being adapted to abut against the supporting plate, inter-engaging means on the core and plate for preventing relative movement between the core and plate, opposed polar projections on the core closely adjacent the open side thereof, a field coil on each of said polar projections, a rotor member rotatably supported between the polar projections, and a longitudinally skewed strap member encircling the core for securing it to the supporting plate.

2. An electric motor adapted to be mounted on a supporting plate positioned at a minimum distance from the axis of the motor, said motor having a generally U-shaped laminated core, the open side of the U-shaped core being adapted to abut against the supporting plate, interengaging means on the core and plate for preventing relative movement between the core and plate, opposed polar projections on the core closely adjacent the open side thereof, a field coil on each of said polar projections, a rotor member rotatably supported between the polar projections, the air gap between the rotor member and the polar projections increasing in width from the side of the rotor member adjacent the supporting plate to the other side of the rotor member, and a longitudinally skewed strap member encircling the core for securing it to the supporting plate.

3. An electric motor adapted to be mounted on a supporting plate positioned at a minimum distance from the axis of the motor, said motor having a generally U-shaped laminated core structure, the open side of said core structure being adapted to abut against the supporting plate, the core structure having opposed salient pole portions closely adjacent the open side thereof, and the closed side of the core being closely adjacent the pole portions so that the core is of small size, a field coil on each of said pole portions, and a rotor member rotatably supported between the pole portions with its axis spaced from the supporting plate a distance which does not greatly exceed the radius of the rotor member, the air gap between the rotor member and the pole portions increasing in width from the side of the rotor member nearest the supporting plate to the other side of the rotor member.

FRANCIS H. GERLACH.
JOHN D. MINER, Jr.

REFERENCES CITED

The following references are of record in the file of this patent:

UNITED STATES PATENTS

| Number    | Name      | Date          |
|-----------|-----------|---------------|
| 516,784   | Wuest     | Mar. 20, 1894 |
| 982,784   | Behrend   | Jan. 31, 1911 |
| 1,205,156 | Butler    | Nov. 21, 1916 |
| 1,216,002 | Shea      | Feb. 13, 1917 |
| 1,284,365 | Kettering | Nov. 12, 1918 |
| 2,122,374 | Kohlhagen | June 28, 1938 |
| 2,331,628 | Piron     | Oct. 12, 1943 |